United States Patent
Bala et al.

(10) Patent No.: US 11,218,873 B2
(45) Date of Patent: Jan. 4, 2022

(54) COMMUNICATION SYSTEM AND METHOD

(71) Applicant: ORANGE, Issy-les-Moulineaux (FR)

(72) Inventors: Suman Bala, Chatillon (FR); Said Gharout, Chatillon (FR); Dominique Barthel, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 259 days.

(21) Appl. No.: 16/606,961

(22) PCT Filed: Apr. 17, 2018

(86) PCT No.: PCT/FR2018/050963
§ 371 (c)(1),
(2) Date: Oct. 21, 2019

(87) PCT Pub. No.: WO2018/193203
PCT Pub. Date: Oct. 25, 2018

(65) Prior Publication Data
US 2020/0288312 A1 Sep. 10, 2020

(30) Foreign Application Priority Data

Apr. 19, 2017 (FR) ...................................... 1753396

(51) Int. Cl.
*H04L 29/06* (2006.01)
*H04W 12/0431* (2021.01)
(Continued)

(52) U.S. Cl.
CPC ....... *H04W 12/0431* (2021.01); *H04L 9/0861* (2013.01); *H04L 9/14* (2013.01);
(Continued)

(58) Field of Classification Search
CPC ......... H04W 12/04031; H04W 12/401; H04W 12/041; H04L 63/061; H04L 63/0428; H04L 63/06; H04L 9/0861; H04L 9/14
(Continued)

(56) References Cited

U.S. PATENT DOCUMENTS 8,064,605 B2 * 11/2011 Brutch .................... G06F 21/57
380/277
8,645,978 B2 * 2/2014 Bernbo .................... G06F 9/54
719/328

(Continued)

OTHER PUBLICATIONS

International Search Report dated May 23, 2018 for corresponding International Application No. PCT/FR2018/050963, filed Apr. 17, 2018.
(Continued)

*Primary Examiner* — Amare F Tabor
(74) *Attorney, Agent, or Firm* — David D. Brush; Westman, Champlin & Koehler, P.A.

(57) ABSTRACT

A communication system which includes a terminal, a telecommunications network server able to provide a network service to the terminal; and an application server able to provide application services to the terminal via the network and the network server. The terminal and the network server share and store a same network root key kept secret from the application server and are configured to generate, on the basis of this network root key, a network session key used to sign and verify the integrity of messages exchanged on the network between the terminal and the network server. The terminal and the application server share and store a same application root key kept secret from the network server, and configured to generate, on the basis of this application root key, an application session key used to encrypt and decrypt messages exchanged between the terminal and this application server via the network.

11 Claims, 4 Drawing Sheets

(51) Int. Cl.
   *H04L 9/08*    (2006.01)
   *H04L 9/14*    (2006.01)
   *H04W 12/041*  (2021.01)

(52) U.S. Cl.
   CPC ........ *H04L 63/0428* (2013.01); *H04L 63/061* (2013.01); *H04W 12/041* (2021.01)

(58) Field of Classification Search
   USPC ........................................................ 713/168
   See application file for complete search history.

(56) References Cited

U.S. PATENT DOCUMENTS

| | | | |
|---|---|---|---|
| 9,571,472 B2* | 2/2017 | Pochuev | H04L 41/0806 |
| 9,590,961 B2* | 3/2017 | Sundaram | H04W 4/70 |
| 9,673,974 B2* | 6/2017 | Zhang | H04L 9/0816 |
| 10,454,909 B2* | 10/2019 | Yu | H04L 63/06 |
| 2020/0389788 A1* | 12/2020 | Smeets | H04L 9/321 |

OTHER PUBLICATIONS

English translation of the International Written Opinion dated Jun. 6, 2018 for corresponding International Application No. PCT/FR2018/050963, filed Apr. 17, 2018.

N. Sornin et al., LoRaWAN(TM) Specification V1.0.2, Jul. 31, 2016 (Jul. 31, 2016), XP055423468.

Olivier Hersent et al., "LoRa Device Developer Guide", Orange Connected Objects & Partnerships, Apr. 30, 2016 (Apr. 30, 2016), XP055286484.

LoRa Alliance, "LoRaWAN Security—Frequently Asked Questions", Jul. 31, 2016 (Jul. 31, 2016), XP055406408.

* cited by examiner

COMMUNICATION SYSTEM AND METHOD

CROSS-REFERENCE TO RELATED APPLICATIONS

This Application is a Section 371 National Stage Application of International Application No. PCT/FR2018/050963, filed Apr. 17, 2018, which is incorporated by reference in its entirety and published as WO 2018/193203 A1 on Oct. 25, 2018, not in English.

BACKGROUND OF THE INVENTION

The invention relates to the general field of telecommunications.

More particularly it relates to an architecture of a communication system in which a terminal communicates with an application server capable of providing application services to this terminal via a telecommunications network, and more particularly a server of this network. No limitation is attached to the nature of the terminal or the nature of the application services provided. The terminal may be a fixed or mobile terminal, such as an electrical meter, a sensor, etc. The application server may be operated by any service provider, such as a supplier of electricity, water, mail services, etc.

The invention thus has a preferred but non-restrictive application in the context of the Internet of Things, and notably of architectures or networks of the Long Range Wide Area Network (LoRaWAN) type, for example. In a known way, the current LoRaWAN standard protocol allows low data rate (less than 50 kbit/s) and low power consumption radio communication, for objects communicating according to LoRA (for "Long Range") technology, and connected to the Internet via a telecommunications network.

In a LoRaWAN type architecture, each terminal (also referred to as a node) is caused to communicate with an application server via a telecommunications network. More particularly, the data transmitted by each terminal is received by a plurality of gateways or base stations which relay it to a network server. This network server filters the messages received from the terminals (and notably verifies their origin and their integrity), and retransmits them to the application servers concerned.

LoRaWAN architectures implement two security mechanisms, one at the network level and one at the "application" level. The security mechanism implemented at the network level consists both in ensuring the authenticity of the communicating terminal, and in ensuring the authenticity and integrity of the messages that it transmits. The security mechanism implemented at the application level is aimed at ensuring the confidentiality of the exchanges between the terminal and the application server with which it communicates, notably with regard to the operator of the telecommunications network on which the messages are conveyed. These security mechanisms are based, in the current versions of the LoRaWAN protocol, on the known symmetric cryptographic algorithm AES (for Advanced Encryption Standard).

In version 1.0 of the LoRaWAN protocol, a single "root" (or master) cryptographic key is used for generating two "session keys", one being used at the network level (a "network session key") for signing and verifying the integrity of the messages transmitted or addressed to the terminal, the other being used at the application level (an "application session key") for encrypting/decrypting the payload data sent or received by the terminal. For this purpose, the root key is stored at the terminal and at the network server. The terminal sends a connection request ("join request") to the network server for activating a session. In response to this request, the network server sends a response accepting the connection ("join accept") and generates two session keys, namely a network session key and an application session key.

The network server therefore has knowledge of the application session key used for encrypting the exchanges (and notably the payload data) between the terminal and the application server concerned. This poses a problem of confidentiality of the data exchanged at the application level with regard to the telecommunications network operator.

SUBJECT MATTER AND SUMMARY OF THE INVENTION

The invention makes it possible notably to overcome the aforementioned drawback by providing a communication system comprising:
  a terminal;
  a server of a telecommunications network (also sometimes referred to as a "network server" in the rest of the description), capable of providing at least one network service to the terminal; and
  at least one application server, capable of providing application services to the terminal via the telecommunications network and the telecommunications network server;
the system being noteworthy in that:
  the terminal and the network server share and store the same "network root key" kept secret with regard to the application server, and are configured for generating from this network root key at least one network session key intended to be used for signing and verifying the integrity of messages exchanged on the network between the terminal and the network server; and
  the terminal and the application server share and store the same "application root key" kept secret with regard to the network server, and are configured for generating from this application root key at least one application session key intended to be used for encrypting and decrypting messages exchanged between the terminal and this application server via the network.

"Key kept secret with regard to a server" is understood to mean that this key is at no time disclosed to said server. Typically, at any time, this key is not exchanged or sent in a message addressed to or passing through this server.

The invention thus provides a novel approach for managing network and application root keys according to which these keys are managed and held separately by the network server and by the application server respectively. They are advantageously kept secret with regard to the other server, i.e. the network root key is shared only between the network server and the terminal and is kept secret with regard to the application server, while the application root key is shared only between the application server and the terminal and is kept secret with regard to the network server.

In this way, the network and application session keys may be generated independently of one another (i.e. decoupled) by the network and application servers respectively, and remain secret with regard to the other server. The problems of application data confidentiality that exist in the prior art with regard to the telecommunications network operator are thus solved.

The architecture provided by the invention therefore offers a secure end-to-end solution, between the terminal and the network server for the network part, and between the terminal and the application server for the application part, wherein each actor (network operator or service provider) is assured protection of the confidentiality of its data. The telecommunications network operator further remains the master of controlling access to its network as it is the only one to know the network root keys associated with each terminal. It is further assumed, of course, that a secure interface is established between the network server and the application server allowing a secure and confidential exchange of data between these two servers.

It is noted that the invention, although having many advantages in the context of communication systems comprising a terminal, a network server and at least one application server configured for implementing the LoRaWAN protocol, also applies to other network architectures that rely on two types of servers as in the invention for providing both network services and other application services. Such network architectures include, for example, known network architectures such as SigFox, Weightless, NWave, or WM-bus.

The independence of the network and application root keys and their separate management by the network and application servers which keep them secret with regard to each other make it possible to conduct independently of each other, i.e. in a decoupled manner, the procedure for connecting the terminal to the network and the procedure for connecting the terminal to the application server. Typically, these procedures may be carried out one after the other, the network connection procedure being performed first for being able to use the network for the exchange of application data.

Thus, in a particular embodiment of the invention:
the terminal and the network server are configured for generating a "network session key" during a "network connection procedure" for connecting the terminal to the network;
the terminal and said application server are configured for generating an "application session key" during an "application connection procedure" for connecting the terminal to this application server, said application connection procedure being triggered by the terminal after the completion of the network connection procedure.

Correspondingly, the invention is aimed at a communication method within a communication system comprising a terminal, a telecommunications network server capable of providing at least one network service to the terminal, and at least one application server capable of providing application services to the terminal via the telecommunications network and the telecommunications network server, this communication method comprising:
a first step of connecting the terminal to the network server comprising a generation by the terminal and by the network server of a "network session key" from the network root key shared between the terminal and the network server and kept secret with regard to the application server, this network session key being intended to be used for signing and verifying the integrity of messages exchanged on the network between the terminal and the network server;
a second step of connecting the terminal to the application server, this second connecting step comprising a generation by the terminal and by the application server of an "application session key" from the application root key shared between the terminal and the application server and kept secret with regard to the network server, this application session key being intended to be used for encrypting and decrypting messages exchanged between the terminal and this application server via the network;
said at least one second connecting step being implemented after the completion of the first connecting step.

In a particular embodiment, the terminal and the network server are configured for generating at least one "network session key" from the network root key during a terminal session refresh procedure.

The invention further offers the possibility of easily and freely (re)generating session keys, that is to say as much as necessary (i.e. new keys at each new session established with the terminal or for each session refresh) and, if necessary, for a limited period of validity. Thus, the session keys may be "loaned" or shared for a limited period of time with other trusted entities for delegating, for example, some checks performed on the messages exchanged with the terminal (e.g. in "roaming" situations), without, however, lastingly affecting the security of the communication system. At the expiration of the limited period, a new session key may be generated by the network server or the application server thanks to the corresponding root key, making it obsolete and impossible to use the old session key.

In another embodiment, the network and application session keys may have been generated and stored beforehand in the entities concerned.

The invention further allows a terminal multiple communication sessions with multiple separate application servers via the same network server and during the same network session.

For example, in a particular embodiment, the terminal is capable of establishing and maintaining simultaneous connections with a plurality of application servers.

For this purpose, when the system comprises a plurality of application servers, the terminal may share separate application root keys with said plurality of application servers, each root key shared with a said application server being kept secret with regard to the other application servers of said plurality of application servers.

By imposing the sharing of a separate application root key between the terminal and each application server, it is possible for the terminal to communicate simultaneously with multiple application servers, while guaranteeing the confidentiality of the exchanges with regard to each application server. The same terminal may therefore easily establish application sessions with different service providers via the same telecommunications network, without jeopardizing the confidentiality of the exchanges with these service providers.

To do this, in a particular embodiment:
the terminal is configured for sending a single request to the network server to connect to said plurality of application servers, this single request comprising an identifier of each application server of said plurality of application servers; and
the network server is configured for sending, following the receipt of the single request, a plurality of requests to said plurality of application servers, the request sent to a said application server being a request for connecting the terminal to this application server.

The network server is capable, based on the identifiers contained in the single request, of forwarding the terminal connection request to the application servers concerned. It is noted that the requests for connecting to the application servers may be sent simultaneously by the network server to the different application servers or at different instants.

The single request sent to the network server and each separate connection request sent to each of the application servers may be based on requests similar to the requests already provided by the LoRaWAN protocol (adapted as necessary to the implementation of the invention), and said plurality of application servers comprises at most three separate application servers. This specific embodiment exploits the size of the messages and the available data rates according to the LoRaWAN protocol for pooling the connection requests of one terminal with multiple (up to three under the current conditions allowed by the LoRaWAN protocol) application servers.

As a variant, other messages may be introduced for implementing this embodiment, or other fields in these messages, and allowing a connection to more than three separate application servers.

This embodiment therefore makes it possible to group together within the same request the connection request sent by the terminal to different application servers. When a radio communication link exists between the terminal and the network server, this makes it possible to save on the resources of this radio link and to limit the consumption of the terminal.

In a variant embodiment, the terminal may send separate requests to the network server for each of the application servers, which are then relayed by the network server to the application servers concerned.

In another embodiment, the terminal may share the same application root key with multiple application servers, notably when these are operated by the same service provider. This embodiment makes it possible to reduce the complexity of implementation of the invention by limiting the number of separate root keys stored notably at the terminal.

In a particular embodiment, the steps of the communication method are determined by instructions from computer programs.

Accordingly, the invention is also aimed at one or more computer programs on one or more information media, these programs being capable of being implemented in a terminal, an application server and/or a network server, or more generally in a computer, and comprising instructions suited to the implementation of the steps of a communication method such as that described above.

Each of these programs may use any programming language, and be in the form of source code, object code, or intermediate code between source code and object code, such as in a partially compiled form, or in any other desirable form.

The invention is also aimed at a computer-readable information or recording medium, and comprising instructions in a computer program such as that mentioned above.

The information or recording medium may be any entity or device capable of storing the program. For example, the medium may comprise a means of storage, such as a ROM, e.g. a CD ROM or a microelectronic circuit ROM, or else a magnetic recording means, e.g. a hard disk.

Moreover, the information or recording medium may be a transmissible medium such as an electrical or optical signal, which may be routed via an electrical or optical cable, by radio or by other means. The program according to the invention may in particular be downloaded on an Internet type network.

Alternatively, the information or recording medium may be an integrated circuit incorporating the program, the circuit being suitable for executing or for being used in the execution of the method in question.

According to another aspect, the invention is also aimed at a terminal of a communication system comprising said terminal, a telecommunications network server capable of providing at least one network service to the terminal, and at least one application server capable of providing application services to the terminal via the telecommunications network and the telecommunications network server, the terminal comprising:
- a first module for storing a "network root key" shared with the network server and kept secret with regard to said application server;
- a first generating module, configured for generating from this network root key, at least one "network session key";
- a signing and verifying module, configured for signing and/or verifying messages exchanged between the terminal and the network server by means of the network session key generated by the first generating module;
- a second module for storing at least one "application root key" shared with the application server and kept secret with regard to the network server;
- a second generating module configured for obtaining at least one "application session key" from the application root key shared with the application server; and
- an encryption and decryption module, configured for encrypting and/or decrypting messages exchanged between the terminal and the application server via the network by means of the application session key generated by the second generating module.

No limitation is attached to the nature of the storage modules; it may be a microSD card, a UICC (Universal Integrated Circuit Card), such as a SIM (Subscriber Identity Module) or USIM (Universal SIM) card, an eUICC (embedded Universal Integrated Circuit Card) card also called an eSIM, or even a battery fitted with a memory. These storage modules associated with the terminal may form an integral part of the terminal or be removable.

In a particular embodiment:
- the first storage module is included in a network interface module of the terminal; and
- the second storage module is included in an application module of the terminal.

The use of two separate network and application interface modules allows a simple decoupling, linked directly to the architecture of the terminal, of the network and application connection procedures implemented by the terminal with the network server and each application server.

In a particular embodiment, the first generating module is activated by the network interface module in a "network connection procedure" for connecting the terminal to the network server, and the second module for generating an application session key is activated by the application module of the terminal in an "application connection procedure" for connecting the terminal to the application server, this application connection procedure being implemented by the application module after the completion of the network connection procedure.

In a particular embodiment, the system comprises a plurality of application servers and the second storage module comprises a plurality of separate application root keys shared with said plurality of application servers, each application root key shared with a said application server being kept secret with regard to the other application servers of said plurality of application servers.

In another embodiment, the terminal comprises a transmission module configured for sending a single request to the network server to connect to said plurality of application servers, this single request comprising an identifier of each application server of said plurality of application servers.

In an alternative embodiment, the terminal comprises a transmission module configured for sending a plurality of requests to the network server to connect to said plurality of application servers, each request comprising an identifier of a separate application server of said plurality of application servers.

The terminal according to the invention, in all the aforementioned embodiments, benefits from the same advantages as the communication system and the communication method according to the invention.

It is also conceivable, in other embodiments, that the communication method, the communication system and the terminal according to the invention in combination have all or part of the aforementioned features.

BRIEF DESCRIPTION OF THE DRAWINGS

Other features and advantages of the present invention will emerge from the following description, with reference to the appended drawings, which illustrate an exemplary embodiment that is in no way restrictive. In the figures.

DETAILED DESCRIPTION OF THE INVENTION

Figure 1:
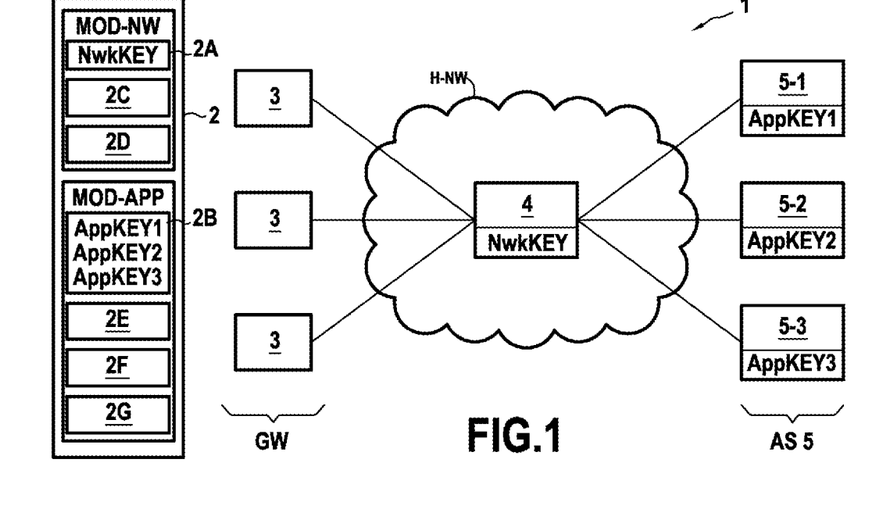
FIG. 1 schematically represents a communication system conforming to a particular embodiment of the invention.

FIG. 1 represents, in its environment, a communication system 1 conforming to a particular embodiment of the invention.

In the example envisaged in FIG. 1, the communication system 1 is based on a wide area telecommunications network implementing the LoRaWAN protocol. In a known way, the LoRaWAN protocol is particularly suitable in the context of the Internet of Things for allowing various communicating objects to exchange therebetween. No limitation is attached to the nature of the communicating objects. They may take the form of various terminals such as sensors, actuators, or any other type of object. In a known way, such objects, due to their hardware and/or software constraints, cannot connect directly to the Internet for accessing the application services to which they are attached and communicate with these services via a telecommunications network in a star topology.

More particularly here, and in accordance with the architecture defined by the LoRaWAN protocol, the communication system 1 comprises at least one communicating terminal 2, in accordance with the invention, and configured for communicating via a radio link according to the low data rate and low consumption LoRa technology with gateways or base stations 3 of a nominal network H-NW. The gateways 3 relay the messages received from the terminal 2 to a server 4 of the nominal network H-NW, responsible for filtering and monitoring the integrity and authenticity of these messages before transmitting them to the application servers concerned 5. FIG. 1 illustrates three application servers referenced by 5-1, 5-2 and 5-3. However, no limitation is attached to the number of application servers.

In the example considered in FIG. 1, the terminal 2 is, for example, an electricity meter and the application server 5 interacting with the terminal 2 (i.e. with the electricity meter 2), a server 5-1 of an electricity supplier suitable for processing the data uploaded by the electricity meter 2 and providing an application service thereto. This application service is, for example, the preparation from the uploaded data of a corresponding electricity consumption bill, and the provision of this bill to the user associated with the electricity meter. The user may further be provided with a detailed history of their consumption on a web portal of the electricity supplier, etc.

The telecommunications network H-NW is here illustratively managed by a separate operator from the electricity supplier; it is assumed that the operator of the telecommunications network H-NW and the electricity supplier managing the application server 5-1 have concluded a prior agreement ensuring a secure connection between the server 4 of the nominal network H-NW and the application server 5-1.

As mentioned previously, in the LoRaWAN type of architectures, the security of the exchanges between the terminals and the application servers is ensured at two separate levels, i.e. at the network level via various integrity checks performed by the network server acting as intermediaries between the terminals and the application servers and by the terminals themselves, and at the application level, via the encryption/decryption of the application data exchanged between the terminals and the application servers. Each of these mechanisms is based, during each session established by a terminal with an application server via the network server, on the known encryption algorithm AES used in the LoRaWAN protocol parameterized sometimes by means of network session cryptographic keys, sometimes by means of application session cryptographic keys. These cryptographic keys are 128 bits in size here. It is noted, however, that the invention makes it possible to easily conceive of other symmetric encryption algorithms than the AES encryption algorithm, as well as other key sizes.

In accordance with the invention, the network server 4 stores a "network root cryptographic (or master) key", denoted by NwkKEY, which it shares with the terminal 2, this network root key being kept secret between these two devices, and notably with regard to the application servers 5 (and the application server 5-1 more specifically here). This network root key NwkKEY is hard stored here (i.e. in hardware) in a secure space 2A of the terminal 2 (first storage module within the meaning of the invention) and in a memory of the network server 4. The secure space 2A is included here in (or more generally accessible through) a network interface module MOD-NW of the terminal 2 configured for interacting with the network server 4.

Furthermore, in accordance with the invention, the application server 5-1 stores an "application root cryptographic key", denoted by AppKEY1, which it shares with the terminal 2, this application root key being kept secret between these two devices, and notably with regard to the network server 4. In the embodiment described here, the application root key AppKEY1 is further specific to the application server 5-1 and is kept secret with regard to the other application servers 5-2 and 5-3. This master application key AppKEY1 is hard stored here (i.e. in hardware) in a secure space 2B of the terminal 2 (second storage module within the meaning of the invention) and in a memory of the application server 5-1. The secure space 2B of the terminal 2 is included here in (or more generally accessible through)

an application module MOD-APP of the terminal 2, configured for interacting with the application server 5-1 via the network server 4.

It is noted that as further detailed later, the invention allows the same terminal to establish simultaneous sessions with multiple application servers (in the example in FIG. 1 notably with the servers 5-1, 5-2 and 5-3). For this purpose, the secure space 2B may contain a plurality of areas isolated from each other, also termed security domains, associated with each of the application servers. Each security domain contains the application key or keys associated with the same application server. This advantageously allows each application server to customize the security domain of each terminal.

In the embodiment described here, this independent management of the network and application root keys makes it possible to ensure a two-fold security level via connection procedures to the network server 4 and to the application server(s) 5 performed separately and independently, and during which network and application session keys are generated separately and independently of each other.

More precisely, in the embodiment described here, the network session keys are generated during a procedure for connecting the terminal 2 to the network server 4 (referred to in the description by "network connection procedure") from the network root cryptographic key NwkKEY, shared between the terminal 2 and the network server 4. The terminal 2 and the server 4 of the network H-NW are configured here, as described in more detail later, for generating, during a procedure for connecting the terminal 2 to the server 4 of the network H-NW, two network session keys from the network root key NwkKEY. For this purpose, the terminal 2 comprises in its network interface module MOD-NW a module 2C for generating network session keys, activated during the network connection procedure and implemented here by hardware. As a variant for other types of terminals, this module may be in software.

The two network session keys generated comprise a network session key denoted by NwkSKEYup for the uplink exchanges (i.e. in the terminal 2 to server 4 direction), and a network session key denoted by NwkSKEYdown for the downlink exchanges (i.e. in the server 4 to terminal 2 direction). These two session keys are shared by the terminal 2 and the server 4 of the nominal network H-NW and kept secret by them (except in a particular case, as described later for roaming or handover situations), notably with regard to the application servers 5. In the embodiment described here, the terminal 2 and the server 4 of the network H-NW use for generating the network session keys from the network root key NwkKEY the AES encryption algorithm, in a way known per se and not described in detail here. However, no limitation is attached to the way in which the network session keys are generated from the network root key NwkKEY (e.g. derived directly from the root key or from a certificate associated with this root key, etc.). It is further noted that the terminal 2 and the server 4 may proceed in the same way for generating new network session keys during a session key refresh procedure, as detailed later notably with reference to FIG. 6.

Once the network session keys have been generated by the terminal 2 and the server 4, these two entities (i.e. the terminal and the server) are configured for using these keys for signing and verifying the integrity of messages that they exchange on the nominal network H-NW. For this purpose, the terminal 2 notably uses a module 2D for signing and verifying, implemented, for example, here in hardware in its network interface module MOD-NW. As a variant, a software implementation may be considered for other types of terminals.

Similarly, an application session key is generated during a procedure for connecting the terminal 2 to the application server 5-1 (referred to in the rest of the description as an application connection procedure), from the application root cryptographic key AppKEY1, shared between the terminal 2 and the application server 5-1. The application session key is shared by the terminal 2 and the application server 5-1 and kept secret by these, notably with regard to the server 4 of the network H-NW and also here from the other application servers 5-2 and 5-3. In the embodiment described here, the terminal 2, via a generating module 2E for generating an application session key activated during the application connection procedure (this module being included here in its application module MOD-APP and implemented in hardware), and the application server 5-1 use for generating the application session key from the application master key AppKEY1 the AES algorithm in a way known per se and not described in detail here. However, no limitation is attached to the way in which the application session key is generated from the application root key AppKEY1 (e.g. derived directly from the root key or from a certificate associated with this root key, etc.).

Once the application session key has been generated by the terminal 2 and by the application server 5-1, these two entities (i.e. the terminal and the application server) are configured for using this key for encrypting and decrypting the messages containing application data which they exchange via the nominal network H-NW. For this purpose, the terminal 2 here uses a module 2F for encrypting/decrypting implemented in hardware in its application module MOD-APP. As a variant, for other types of terminals, this module may be implemented in software.

As mentioned previously, in the example considered here, the terminal 2, the network server 4 and the application servers 5 are configured for implementing the LoRaWAN protocol. A description will now be given in more detail, with reference to FIGS. 2 to 6, of how the architecture provided by the invention, which is based on the independent storage at the level of the server 4 of the nominal network H-NW of the network root key NwkKEY (and incidentally of the network session keys generated from this network root key) and at the level of the application server 5-1 of the application root key AppKEY1 (and incidentally of the application session key generated from this application root key), may easily be connected with the various connection and session key refresh procedures provided under the LoRaWAN protocol. It is noted that these examples of application of the invention are given only by way of illustration, and that the invention may also be applied in combination with other procedures provided by the LoRaWAN protocol, such as, for example, with roaming or handover procedures. FIGS. 3 to 6 illustrate the various steps of a communication method according to the invention as it is implemented by the communication system 1 in various embodiments for allowing the implementation of the aforementioned procedures.

Figure 2:
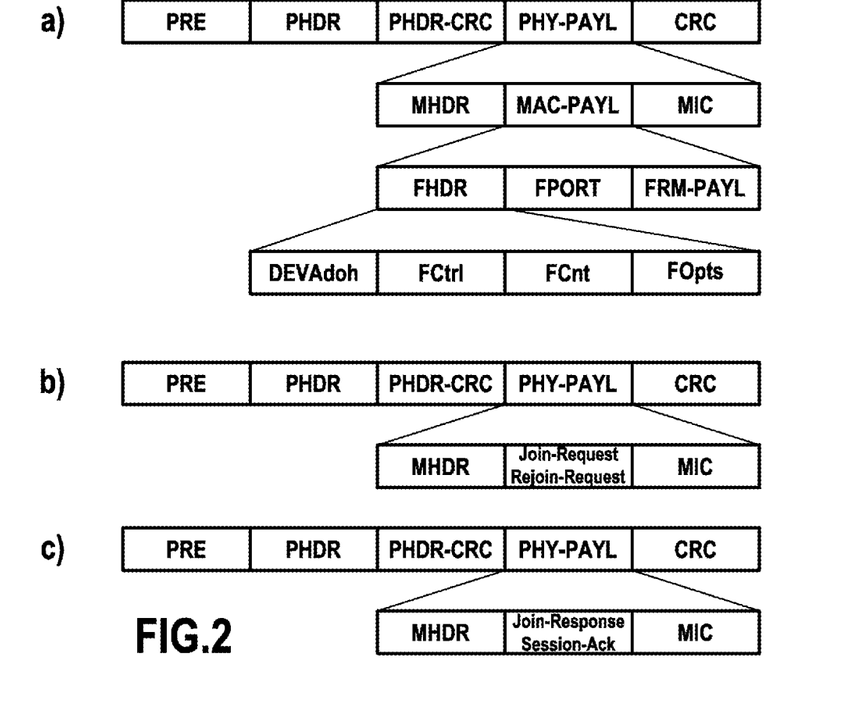
FIG. 2 represents the message format defined by the LoRaWAN protocol.

In each of these procedures, in accordance with what is currently implemented by the LoRaWAN protocol, the exchanges between the various entities of the communication system 1 are based on a common message format some fields of which differ depending on the type of the message (i.e. at the network or application level, in the case of a request, a response or an acknowledgment, etc.). This format is illustrated in FIG. 2.

It comprises, for the physical layer of the OSI (Open Systems Interconnection) model, a preamble PRE, a header PHDR, a parity check code for the header PHDR-CRC, payload data PHY-PAYL and a parity check code for the payload data CRC (used only in the uplink channel).

The payload data PHY-PAYL contains information relating to the MAC (Medium Access Control) layer of the OSI model, namely:

a MAC header denoted by MHDR notably specifying the type of message. The LoRaWAN protocol currently defines several types of message, e.g. a connection request "Join-Request" and a message of acceptance of the request "Join-Accept". In accordance with the invention, and as indicated previously, the network and application connection procedures are decoupled, so that separate message types are preferably defined for each of these procedures. Thus, new message types may be used in the header MHDR such as, for example, a request for connecting to the network of the "Nwk-Join-Request" type, a message of acceptance of the request for connecting to the network of the "Nwk-Join-Accept" type, an application request for connecting to a single application server of the "App-Join-request" type or a single request for connecting to to multiple application servers "mAPP-Join-Request", a message of acceptance of the request for connecting to the application server of the "App-Join-Accept" or in the case of multiple application servers "mApp-Join-Accept" type, etc.;

payload data MAC-PAYL (see FIG. 2(a)); and a Message Integrity Code MIC, calculated on all the fields of the message, from a network session key.

The payload data MAC-PAYL may be replaced by a connection request ("Join-Request", see FIG. 2(b)), by a connection response ("Join-Response", see FIG. 2(c)) or else by a refresh request ("Rejoin-request") or an acknowledgment ("Session-Ack").

The payload data MAC-PAYL comprises a frame header FHDR, a frame port FPort which makes it possible to determine whether the message carries MAC service orders (which may be exchanged exclusively between the network server and the MAC layer of the terminal) or application data, and frame payload data FRM-PAYL. It is noted that the payload data whatever its nature (application or service order type) is always encrypted. If the frame payload data conveys application data, this encryption is implemented before calculating the MIC code. If the frame payload data carries service orders, the encryption is performed with a network session key; otherwise, it is performed with the application session key.

This common message format is based on the format described in the standard documents of the LoRaWAN protocol, adapted when necessary for the implementation of the invention (see examples mentioned above). It is noted that some fields or field values of the message are left free in version 1.0 of the protocol which can be used for defining new message types for the implementation of the invention.

A description will now be given in more detail of the various procedures implemented by the communication system 1. It is noted that these procedures are sometimes based on known steps of version 1.0 of the LoRaWAN protocol, and sometimes provide adjustments to these procedures for reflecting the separate management of the application and network root keys provided by the invention.

For simplicity, the following description omits the participation of the gateways 3 in the procedures described. It goes without saying, however, that any communication of the terminal 2 with a network server is performed via one of these gateways.

Figure 3:
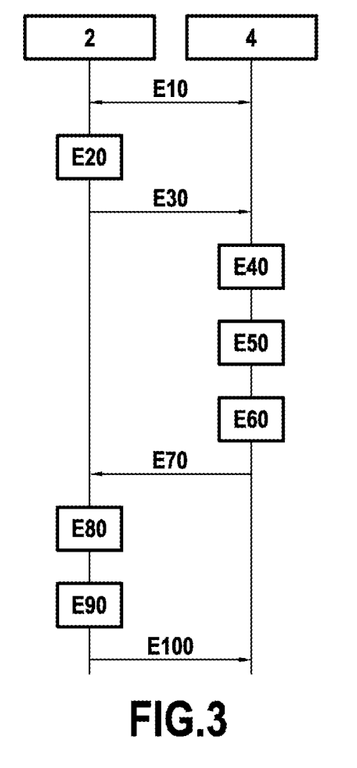
FIGS. 3 to 6 represent different procedures exploiting the architecture of the communication system in FIG. 1 and based on the communication method according to the invention implemented by this communication system.

FIG. 3 illustrates the first steps of the communication method according to the invention as they are implemented by the communication system 1 for allowing the terminal 2 to connect to the server 4 of the nominal network H-NW. These first steps form a "network connection procedure" implemented by the terminal 2 as a preliminary to any communication with the application server 5-1. This network connection procedure here is based on messages of the "join-request" and "join-accept" type taking the formats illustrated in FIGS. 2b) and 2c). It is implemented by the terminal 2 via its network interface module MOD-NW.

It is assumed here as a preliminary that the terminal 2 has various information stored in memory, namely:

a unique identifier DevEUI of the terminal 2 (coded in 8 bytes here), a unique identifier NwkEUI of the nominal network H-NW (coded in 8 bytes here), and a unique identifier AppEUI1 of the application server 5-1 with which it wishes to communicate (coded in 8 bytes here). In the example considered here, these identifiers conform to the address space IEEE EUI64; and network NwkKEY and application AppKEY1 root keys, shared respectively with the server 4 of the nominal network H-NW and with the application server 5-1.

It is noted that this information could be hard recorded in the terminal 2, e.g. by the manufacturer of the terminal.

It is further assumed that the server 4 of the nominal network H-NW also has various information stored in memory, namely the unique identifier DevEUI of the terminal 2, the unique identifier NwkEUI of the nominal network H-NW, and the network root key NwkKEY shared with the terminal 2.

Finally, it is assumed that the terminal 2 and the server 4 of the nominal network H-NW have implemented an OTAA (Over The Air Activation) type of procedure, allowing them to recognize each other (step E10).

Then, the terminal 2 generates a random number DevNonceN (coded in 2 bytes here) and a MIC integrity code for its connection request (step E20). For this purpose, it uses the CMAC (for "block cipher based message authentication code") function of the AES encryption algorithm, designated by AES_cmac, parameterized here by the network root key NwkKEY (or by another parameter derived from the network root key NwkKEY), and applied to the concatenation of the MHDR field of the message format represented in FIG. 2, the identifiers DevEUI and NwkEUI and the random number DevNonceN in order to generate a message authentication code cmac, that is:

cmac=AES_cmac (NwkKEY,MHDR|DevEUI|NwkEUI|DevNonceN)

The MIC integrity code is then obtained from the first four bytes of the cmac code, that is:

MIC=cmac[0 . . . 3]

The terminal 2 then sends a connection request to the server 4 of the nominal network H-NW (step E30). This request here is a "Nwk-Join-Request" message based on the message format illustrated in FIG. 2(b), and comprising the identifier DevEUI, the identifier NwkEUI and the random number DevNonceN. This message is not encrypted. The network connection request sent by the terminal also contains in accordance with the format illustrated in FIG. 2b) the MIC code calculated by the terminal 2 in step E20.

On receiving the request for connecting the terminal 2, the server 4 of the nominal network H-NW verifies the MIC code from the information transmitted by the terminal 2 in the connection request and from the network root key NwkKEY that it shares with the terminal 2 (step E40).

If the MIC code is valid, it generates in its turn a random number NwkNonce (in 3 bytes here), and uses this number to generate two network session keys, one for the uplink channel (NwkSKEYup) and one for the downlink channel (NwkSKEYdown) (step E50). For this purpose, here it uses the encryption procedure denoted by AES_encrypt of the AES algorithm, parameterized by the network root key NwkKEY (or by another parameter derived from this root key) and applied to a message here resulting from the concatenation of the number 0x01 (for the network session key NwkSKEYup) or of the number 0x02 (for the network session key NwkSKEYdown), the random number NwkNonce, a network identifier NetID, the random number DevNonceN and a certain number of 0 padding bytes (denoted by $pad_{16}$) for attaining a multiple message dimension of 16 (constraint imposed by the AES algorithm), that is:

NwkSKEYup=AES_encrypt(NwkKEY, 0x01|NwkNonce|NetID|DevNonceN|$pad_{16}$)
NwkSKEYdown=AES_encrypt(NwkKEY, 0x02|NwkNonce|NetID|DevNonceN|$pad_{16}$)

where NetID designates an identifier assigned to the nominal network H-NW (coded in 3 bytes here) and uniquely identifying the operator of the nominal network H-NW.

The server 4 of the network H-NW further generates a MIC integrity code using the AES_cmac function of the AES algorithm according to (step E60):

cmac=AES_cmac(NwkKEY,MHDR|DevEUI|NwkEUI|DevNonceN|NwkNonce|NetID|DevAddr|DLsettings|RxDelay|CFList)

where:
DevAddr is an identifier of the terminal 2 in the nominal network H-NW (here coded in 4 bytes);
DLsettings, RxDelay and CFList designate technical parameters of the transmission, and more particularly the frequencies used by the nominal network, the time between transmissions from the terminal to the network and from the network to the terminal, and the transmission rates to be used (these fields being encoded here in 1, 1 and 16 bytes, respectively).

It is noted that the parameters NetID, DevAddr, DLsettings, RxDelay and CFList are parameters used in the LoRaWAN protocol and are not described in detail here.

The server 4 retains the first 4 bytes of the cmac code for generating the MIC code, that is:

MIC=cmac[0 . . . 3]

Then it responds to the request for connecting the terminal 2 with a message of acceptance of the connection ("Nwk-Join-Accept" message according to the format illustrated in FIG. 2*c*)) comprising the identifier DevEUI, the identifier NwkEUI, the random number NwkNonce, the identifier NetID, the identifier DevAddr, and the parameters DLsettings, RxDelay and CFList (step E70). The acceptance message "Nwk-Join-Accept" is encrypted here with the network root key NwkKEY shared with the terminal 2. As a variant, any other key derived from the network root key may be used for encrypting the acceptance message.

On receiving the acceptance message, the terminal 2 decrypts it by means of the network root key NwkKEY that it shares with the server 4 (step E80), and verifies the MIC code using the same network key and the information contained in the acceptance message.

If the MIC code is valid, the terminal 2 via its generating module 2C (activated for this purpose by the network interface module MOD-NW), in its turn generates the network session keys NwkSKEYup and NwkSKEYdown (step E90), in a similar way to what was implemented by the server 4 in step E50.

Then the terminal 2 sends to the server 4 a message of acknowledgment of generating the network session keys ("NwkSkey-Ack" message) signed and encrypted here with the network root key NwkKEY (or with a key derived from the network root key) (step E100). This acknowledgment message notably comprises the identifier DevEUI, the identifier NwkEUI and the two random numbers DevNonceN and NwkNonce. It is noted that such an acknowledgment message is not provided today by the standardized version 1.0 of the LoRaWAN protocol. It could be introduced into this protocol according to a mechanism similar to that used for messages of the "join-request" and "join-accept" type, replacing the physical layer data PHY-PAYL, as described previously with reference to FIG. 2.

This closes the network connection procedure of the terminal 2 to the server 4 of the nominal network H-NW, implemented by the network interface module MOD-NW of the terminal 2. Consequently, the terminal 2 and the server 4 may use the generated network session keys (NwkSKEYup and NwkSKEYdown) that they share for signing (via the generation of a MIC integrity code) and verifying the integrity of the messages (via verifying the MIC integrity code) that they exchange via the nominal network H-NW. This is illustrated in more detail in the other procedures explained below. It is noted that the network session keys NwkSKEYup and NwkSKEYdown are intended to remain secret (except in a few particular procedures as described below), especially with regard to entities involved in the application services. They are thus kept secret with regard to the application servers 5 (and in particular here the application server 5-1), and are never transmitted thereto.

Figure 4:
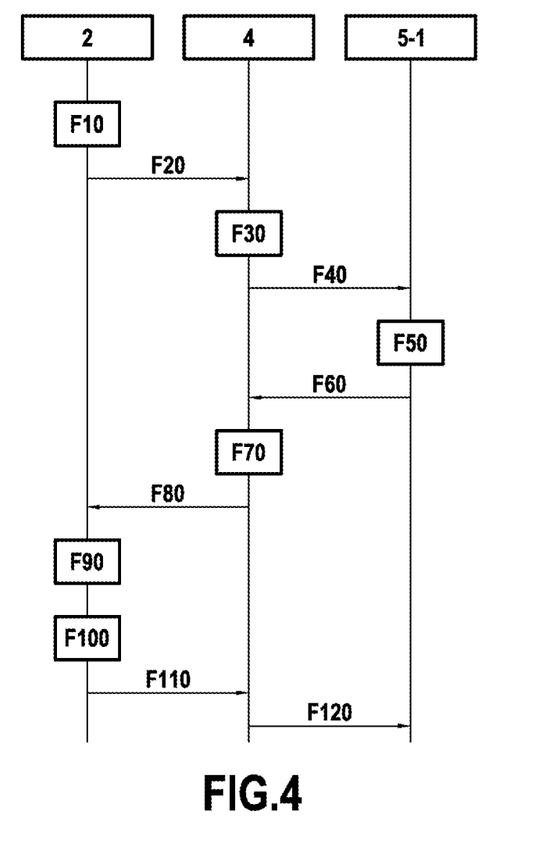

FIG. 4 illustrates the steps of the communication method according to the invention as they are implemented by the communication system 1 following the network connection procedure for allowing the terminal to connect to the application server 5-1. These steps form an "application connection procedure" for connecting the terminal 2 to the application server 5-1, triggered after the completion of the network connection procedure for connecting the terminal 2 to the server 4 of the nominal network H-NW described with reference to FIG. 3.

The application connection procedure is implemented by the terminal 2 via its application module MOD-APP. It is also based on messages of the "join-request" and "join-accept" type taking the formats illustrated in FIGS. 2*b*) and 2*c*).

It is assumed as a preliminary that the application server 5-1 has various information stored in memory, namely, the unique identifier DevEUI of the terminal 2, the unique identifier AppEUI1 of the application server 5-1, and the application root key AppKEY1 shared with the terminal 2.

The terminal 2 generates a random number DevNonceA (coded in 2 bytes here) and a MIC integrity code for signing its request for connecting to the application server 5-1 (step F10). For this purpose, it uses the AES_cmac function of the AES encryption algorithm parameterized by the network session key NwkSKEYup and applied to the concatenation of the MHDR field of the message format represented in FIG. 2, the identifiers DevEUI, NwkEUI and AppEUI1 and the random number DevNonceA, in order to generate a message authentication code cmac, that is:

cmac=AES_cmac(NwkSKEYup, MHDR|DevEUI|NwkEUI|AppEUI1|DevNonceA)

The MIC integrity code is then obtained from the first four bytes of the cmac code thus generated, that is:

MIC=cmac[0 . . . 3]

The terminal 2 then sends a connection request to the server 4 of the nominal network H-NW for allowing it to connect to the application server 5-1 (step F20). This request here is an "App-Join-Request" message based on the message format illustrated in FIG. 2b), and comprising the identifier DevEUI, the identifier NwkEUI, the identifier AppEUI1 and the random number DevNonceA. This message is not encrypted. The connection request sent by the terminal 2 also contains in accordance with the format illustrated in FIG. 2b) the MIC code calculated by the terminal 2 in step F10.

On receiving the request for connecting the terminal 2, the server 4 of the network H-NW verifies the MIC code from the information transmitted by the terminal 2 in the connection request and from the session key NwkSKEYup that it shares with the terminal 2 (step F30).

If the MIC code is valid, the server 4 relays the request for connecting the terminal 2 to the application server 5-1 (step F40). For this purpose it uses a "Fwd-App-Join-Request" message comprising the same parameters as the connection request "App-Join-Request" and the identifier NetID of the nominal network H-NW.

On receiving the request for connecting the terminal 2, the application server 5-1 in its turn generates a random number AppNonce (in 3 bytes here), and uses this number to generate an application session key AppSKEY1 intended to be shared with the terminal 2 (step F50). For this purpose, here it uses the encryption procedure denoted by AES_encrypt of the AES algorithm parameterized by the application root key AppKEY1 and applied to a message here resulting from the concatenation of the number 0x03, the random number AppNonce, the network identifier NetID, the random number DevNonceA and a certain number of 0 padding bytes (denoted by $pad_{16}$) for attaining a multiple message dimension of 16 (constraint imposed by the AES algorithm), that is:

AppSKEY1=AES_encrypt(AppKEY1,
0x03|AppNonce|NetID|DevNonceA|$pad_{16}$)

The application server 5-1 sends a message of acceptance of the connection of the terminal 2 to the server 4 of the nominal network H-NW (step F60). This message here is a message of the "App-Join-Response" type taking the format illustrated in FIG. 2c). It comprises the identifier DevEUI, the identifier NwkEUI, the identifier AppEUI1 and the random number AppNonce.

On receiving the acceptance message from the application server 5-1, the server 4 of the network H-NW generates a MIC integrity code using the function AES_cmac of the AES algorithm parameterized by the network session key NwkSKEYdown according to (step F70):

cmac=AES_cmac(NwkSKEYdown,MHDR|DevEUI|NwkEUI|AppEUI1|DevNonceA|AppNonce)

The server 4 retains the first 4 bytes of the cmac code for generating the MIC code, that is:

MIC=cmac[0 . . . 3]

Then it relays the acceptance message from the application server 5-1 to the terminal 2 in the form of an "App-Join-Accept" message signed with the MIC code that has thus been generated (step F80). The "App-Join-Accept" message comprises in addition to the MIC code, the identifier DevEUI, the identifier NwkEUI, the identifier AppEUI1, the random number DevNonceA and the random number AppNonce.

On receiving the "Fwd-App-Join-Accept" message, the terminal 2 verifies the integrity of this message by verifying the validity of the MIC code by means of the network session key NwkSKEYdown that it shares with the server 4 and the information contained in the message (step F90).

If the MIC code is valid, it generates in its turn, via the activation by the application module MOD-APP of its generating module 2E, the application session key AppSKEY1 in a similar way to what was implemented by the application server 5-1 in step F50 (step F100).

Then the terminal 2 sends to the server 4 a message of acknowledgment of generating the application session key ("AppSkey-Ack" message) signed and encrypted with the application root key AppKEY1 (step F110). This acknowledgment message notably comprises the identifier DevEUI, the identifier NwkEUI, the identifier AppEUI1 and the two random numbers DevNonceA and AppNonce.

The server 4 relays the acknowledgment message to the application server 5-1 (step F120).

This closes the application connection procedure of the terminal 2 to the application server 5-1 implemented by the application module MOD-APP. Consequently, the terminal 2 and the application server 5-1 can use the generated application session key AppSKEY1 that they share for encrypting the messages that they send via the network H-NW and the server 4 of this network. It is noted that the application session key AppSKEY1 is intended to remain secret notably with regard to the server 4 and the other application servers 5-2 and 5-3. They are never transmitted thereto.

It is noted that the network and application connection procedures previously described are based on the algorithms, parameters and other conventions currently used in the LoRaWAN protocol (e.g. AES algorithm, CMAC function, etc.). Of course, these assumptions are not restrictive per se and are only used here in order to illustrate one possible implementation of the invention. Other algorithms, parameters and conventions could be envisaged (e.g. HMAC rather than CMAC function, etc.).

In the embodiment that has just been described with reference to FIG. 4, the terminal 2 connects to a single application server, namely the application server 5-1.

As mentioned previously, the invention advantageously offers the possibility to the terminal 2 to connect simultaneously to other application servers 5, notably in the example considered here to the application servers 5-2 and 5-3. For this purpose, the terminal 2 shares with these application servers a separate application root key, i.e. an application root key AppKEY2 with the application server 5-2 and an application root key AppKEY3 with the application server 5-3; these application root keys are stored in the storage module 2B of the terminal 2, each application root key being preferably stored in a separate security domain of the storage module 2B as mentioned previously. Each application root key shared by the terminal with an application server is kept secret with regard to the other application servers, and of course the network server 4.

In a variant embodiment, the same application root key may be shared with multiple application servers, notably when these are managed by the same service provider.

For connecting to the application server 5-2, the terminal 2 may implement with the latter an application connection procedure similar to that implemented with the application server 5-1, and so on for the other application servers, it being possible for these application connection procedures to be conducted in parallel or successively. Such an implementation is thus based on the sending of multiple connection requests by the terminal 2, via its application module MOD-APP (and notably a transmission module 2G of this application module configured for this purpose), to the different application servers 5, via the network server 4. Each connection request sent by the terminal to an application server contains an identifier of this application server so as to enable the network server 4 to direct the connection request to the application server concerned.

In another embodiment of the invention, the connection procedures of the terminal 2 to the application servers 5-1, 5-2 and 5-3 may pool certain messages transmitted by the terminal 2, and more particularly by its application module MOD-APP. This advantageously makes it possible to limit the consumption of the terminal 2 and save on the radio link between the terminal 2 and the nominal network H-NW.

Figure 5:
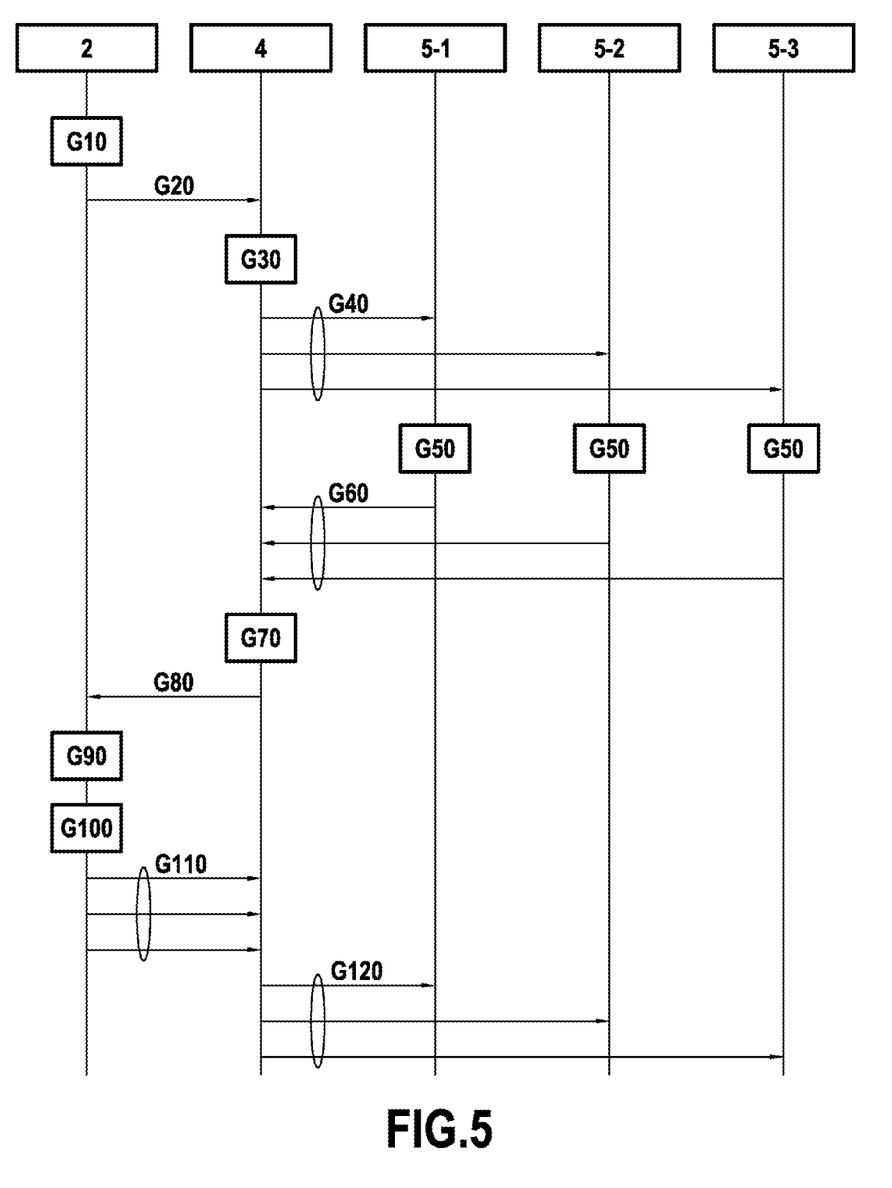

Thus, FIG. 5 illustrates the various steps of the communication method according to the invention as it is implemented in this embodiment by the communication system 1 for allowing the terminal 2 to connect to multiple application servers 5-1, 5-2 and 5-3.

As for the embodiment considered in FIG. 4, this connection procedure "pooled" with the application servers 5-1, 5-2 and 5-3 is implemented by the application module MOD-APP of the terminal 2 following the network connection procedure to the server 4 of the nominal network H-NW described with reference to FIG. 3. It relies on messages of the "mAPP-join-request" and "mAPP-join-accept" type (not provided by version 1.0 of the LoRaWAN standard) taking the formats illustrated in FIGS. 2b) and 2c), which make it possible to define a single connection request intended to be sent by the terminal 2 to the network server 4 to connect to the three application servers 5-1, 5-2 and 5-3.

It is assumed here as a preliminary that the terminal 2 also has identifiers AppEUI2 and AppEUI3 of the application servers 5-2 and 5-3 respectively. In addition, each application server 5 has various information stored in memory, namely, the unique identifier DevEUI of the terminal 2, its own unique identifier (AppEUI1 for the application server 5-1, AppEUI2 for the application server 5-2, and AppEUI3 for the application server 5-3) and the application root key that it shares with the terminal 2 (i.e. AppKEY1 for the application server 5-1, AppKEY2 for the application server 5-2, and AppKEY3 for the application server 5-3).

The terminal 2 generates a random number DevNonceA (coded in 2 bytes here) and a MIC integrity code for signing its request for connecting to the application servers 5-1, 5-2 and 5-3 (step G10). For this purpose, here it uses the AES_cmac function of the AES encryption algorithm parameterized by the network session key NwkSKEYup, and applied to the concatenation of the MHDR field of the message format represented in FIG. 2, the identifiers DevEUI, NwkEUI, AppEUI1, AppEUI2 and AppEUI3, and the random number DevNonceA, in order to generate a cmac message authentication code, that is:

cmac=AES_cmac(NwkSKEYup,
MHDR|DevEUI|NwkEUI|NoAR|AppEUI1|AppEUI2|AppEUI3|DevNonceA)

where NoAR designates the number of application servers concerned by the single request (in other words, the number of application connection requests which are pooled via the sending of a single connection request). The MIC integrity code is then obtained from the first four bytes of the cmac code thus generated, that is:

MIC=cmac[0 . . . 3]

The terminal 2 then sends (via its application module MOD-APP and notably via its transmission module 2G configured for this purpose) a single (i.e. joint) connection request to the server 4 of the nominal network H-NW to allow it to connect to the application servers 5-1, 5-2 and 5-3 (step G20). Here this single request is a "mApp-Join-Request" message based on the message format illustrated in FIG. 2(b), and comprising the identifier DevEUI, the identifier NwkEUI, the identifiers AppEUI1, AppEUI2 and AppEUI3, the random number DevNonceA, and the number NoAR. This message is not encrypted. The single connection request sent by the terminal 2 also contains in accordance with the format illustrated in FIG. 2(b) the MIC code calculated by the terminal 2 in step F10.

It is noted that this joint application connection procedure is not currently provided by the LoRaWAN protocol in its current version and requires the appropriate definition in this protocol of a mApp-Join-Request message notably comprising the identifiers of each application server aimed at by the terminal 2 and of the parameter NoAR (e.g. in one byte).

On receiving the single connection request from the terminal 2, the server 4 of the network H-NW verifies the MIC code from the information transmitted by the terminal 2 in the joint connection request and from the network session key NwkSKEYup that it shares with the terminal 2 (step G30).

If the MIC code is valid, the server 4 transmits a separate connection request of the terminal 2 to each of the application servers 5-1, 5-2 and 5-3 (step G40). For this purpose it uses a "Fwd-App-Join-Request" message comprising, for each application server 5-$i$, i=1, . . . , 3, the identifier DevEUI, the identifier NwkEUI, the identifier AppEUIi corresponding to the application server 5-$i$, the random number DevNonceA and the identifier NetID of the nominal network H-NW.

On receiving the request for connecting the terminal 2, each application server 5-$i$, i=1, . . . , 3 in its turn generates a random number AppNoncei (in 3 bytes here), and uses this number to generate an application session key AppSKEYi intended to be shared with the terminal 2 (steps G50). For this purpose, it uses the encryption procedure denoted by AES_encrypt of the AES algorithm parameterized by the application root key AppKEYi and applied to a message here resulting from the concatenation of the number 0x03, the random number AppNoncei, the network identifier NetID, the random number DevNonceA and a certain number of 0 padding bytes (denoted by $pad_{16}$) for attaining a multiple message dimension of 16 (constraint imposed by the AES algorithm), that is:

AppSKEYi=AES_encrypt(AppKEYi,
0x03|AppNoncei|NetID|DevNonceA|$pad_{16}$)

Each application server 5-$i$ then sends to the server 4 of the nominal network H-NW a message of acceptance of the connection of the terminal 2 (steps G60). This message here is a message of the "App-Join Accept" type taking the format illustrated in FIG. 2c). It comprises the identifier DevEUI, the identifier NwkEUI, the identifier AppEUIi and the random number AppNoncei.

On receiving the acceptance messages from the application servers 5-1, 5-2 and 5-3, the server 4 of the network H-NW generates a MIC integrity code using the AES_cmac function of the AES algorithm parameterized by the network session key NwkSKEYdown according to (step G70):

cmac=AES_cmac(NwkSKEYdown,
MHDR|DevEUI|NwkEUI|NoAR|AppEUI1|AppEUI2|APPEUI3|DevNonceA|AppNonce1|AppNonce2|AppNonce3)

It is noted that in the event of no response from one of the application servers, the field corresponding to the random number AppNonce associated with this application server is replaced in the calculation of the cmac code by padding bytes.

The server 4 retains the first 4 bytes of the cmac code for generating the MIC code, that is:

MIC=cmac[0 . . . 3]

Then it sends a single (i.e. joint) acceptance message to the terminal 2 in the form of a "mApp-Join-Accept" message signed with the MIC code that has thus been generated (step G80). The message "mApp-Join-Accept" further comprises the MIC code, the identifier DevEUI, the identifier NwkEUI, the identifiers AppEUI1, AppEUI2 and AppEUI3, the random number DevNonceA, the random numbers App-Nonce1, AppNonce2 and AppNonce3 and the number NoAR.

On receiving the "mApp-Join-Accept" message, the terminal 2 verifies the integrity of this message by verifying the validity of the MIC code included in the message by means of the network session key NwkSKEYdown that it shares with the server 4 and the information contained in the message (step G90).

If the MIC code is valid, in its turn it generates the application session keys AppSKEY1, AppSKEY2 and AppSKEY3 via its module 2F in a similar way to what was implemented, respectively, by the application server 5-1, by the application server 5-2 and by the application server 5-3 during steps G50 (step G100).

Then the terminal 2 sends to the server 4 for each application server 5-*i*, i=1, . . . , 3 a separate acknowledgment message of generating the application session key AppSKEYi shared with this application server 5-*i* (e.g. "mAppSkey-Ack" message dedicated to this purpose or existing "AppSkey-Ack" message of the LoRaWAN 1.0 standard), signed and encrypted with the application root key AppKEYi that it shares with the application server 5-*i* (steps G110). This acknowledgment message notably comprises the identifier DevEUI, the identifier NwkEUI, the identifier AppEUIi of the application server 5-*i* concerned and the two random numbers DevNonceA and AppNoncei.

The server 4 relays these acknowledgment messages to the application servers 5-1, 5-2 and 5-3 respectively (steps G120).

This closes the pooled procedure for connecting the terminal 2 to the application servers 5-1, 5-2 and 5-3. Consequently, the terminal 2 and each application server 5-*i*, i=1, . . . , 3 can use the generated application session key AppSKEYi that they share for encrypting the messages that they send via the network H-NW and the server 4 of this network. It is noted that each application session key AppSKEYi, i=1, . . . , 3 is intended to be kept secret notably with regard to the server 4 and the other application servers 5-*j*, j differing from i. They are never transmitted thereto.

For allowing the network server 4 to direct the exchanges of the terminal 2 with one of the application servers, the terminal 2 may use the field FPORT in the messages to indicate the application server concerned (via its identifier, for example) (see FIG. 2). As a variant, an additional field may be created for this purpose.

It is noted that although this embodiment has been described for three application servers, it may also be applied to a number of servers other than three. A maximum number of three servers advantageously makes it possible to use messages the format of which conforms to the message format defined in version 1.0 of the LoRaWAN protocol (notably regarding the size of the fields in this message). However, in order to allow a pooling of the resources for connecting to more than three application servers, a new message format could be envisaged, or some field sizes or identifiers reviewed. The invention may further be applied in a context other than wide area networks of the LoRaWAN type in which different message formats are envisaged (e.g. in networks having a known architecture of the Sigfox, Weightless, NWave, WM-bus type, etc.).

Figure 6:
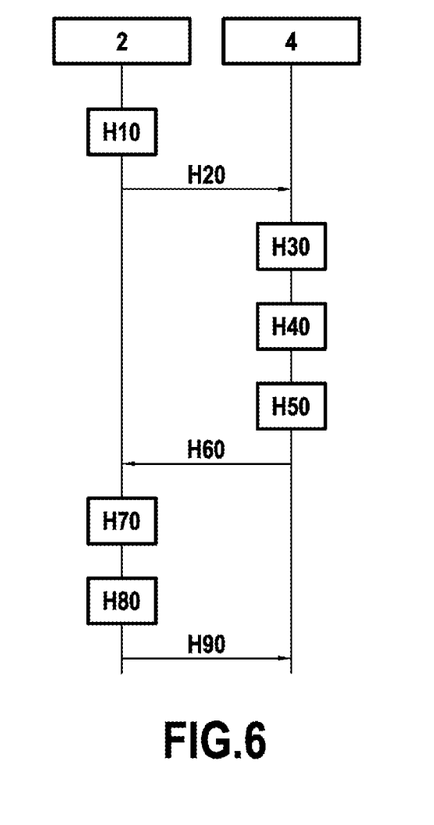

FIG. 6 illustrates a new example of application of the invention: it represents more particularly the various steps of the communication method according to the invention as implemented by the communication system 1 during a session refresh procedure of the terminal 2 with the server 4 of the network H-NW. This refresh procedure, implemented by the network interface module MOD-NW of the terminal 2, follows the network connection procedure to the server 4 of the nominal network H-NW and described with reference to FIG. 3; it is aimed at generating new network session keys intended to be used between the terminal 2 and the server 4 of the network N-HW. It may thus, for example, follow a procedure for generating a first network session key between the terminal 2 and the server 4. This refresh procedure is based on messages of the "rejoin-request" and "rejoin-accept" type taking the formats illustrated in FIGS. 2*b*) and 2*c*).

In accordance with this refresh procedure, the terminal 2 generates an integer counter RJcount (coded in 2 bytes here) (step H10). This counter RJCount is intended to be incremented at each refresh procedure of the session initiated by the terminal 2.

It also generates a MIC integrity code for its refresh request. For this purpose it uses the AES_cmac function of the AES encryption algorithm, parameterized by the network master key NwkKEY, and applied to the concatenation of the MHDR field of the message format represented in FIG. 2, the identifiers DevEUI, NwkEUI and NetID, and the counter RJCount, in order to generate a message authentication code cmac, that is:

cmac=AES_cmac(NwkKEY,MHDR|DevEUI|NwkEUI-|NetID|RJCount)

The MIC integrity code is then obtained from the first four bytes of the cmac code, that is:

MIC=cmac[0 . . . 3]

The terminal 2 then sends a refresh request to the server 4 of the nominal network H-NW (step H20). This request here is a "Nwk-Rejoin-Request" message based on the message format illustrated in FIG. 2(*b*), and comprising the identifier DevEUI, the identifier NwkEUI, the identifier NetID and the counter RJCount. This message is not encrypted. The refresh request sent by the terminal 2 also contains in accordance with the format illustrated in FIG. 2(*b*) the MIC code calculated by the terminal 2 in step H10.

On receiving the refresh request from the terminal 2, the server 4 of the network H-NW verifies the MIC code from the information transmitted by the terminal 2 in the refresh request and from the network root key NwkKEY that it shares with the terminal 2 (step H30).

If the MIC code is valid, it generates a random number NwkNonce (3 bytes here), and uses this number to generate two new network session keys, one for the uplink channel (NwkSKEYup') and one for the downlink channel (NwkSKEYdown') as described previously for step E50 illustrated in FIG. 3 (during this generation the counter RJCount replaces the random number DevNonceN) (step H40).

The server 4 of the network H-NW further generates a MIC integrity code using the AES_cmac function of the AES algorithm according to (step H50):

cmac=AES_cmac(NwkKEY,MHDR|DevEUI|NwkEUI|RJCount|NwkNonce|NetID|DevAddr|DLsettings|RxDelay|CFList)

The server 4 retains the first 4 bytes of the cmac code thus generated for obtaining the MIC code, that is:

MIC=cmac[0 . . . 3]

Then it responds to the request for refreshing the terminal 2 with a message of acceptance of the refresh ("Nwk-Rejoin-Accept" message according to the format illustrated in FIG. 2c)) comprising the identifier DevEUI, the identifier NwkEUI, the random number NwkNonce, the identifier NetID, the identifier DevAddr, and the parameters DLsettings, RxDelay and CFList (step H60). The "Nwk-Rejoin-Accept" acceptance message is encrypted with the network root key NwkKEY shared with the terminal 2.

On receiving the acceptance message, the terminal 2 decrypts it by means of the network master key NwkKEY that it shares with the server 4, and verifies the MIC code using this same network key and the information contained in the acceptance message (step H70).

If the code is valid, in its turn it generates the two new network session keys NwkSKEYup' and NwkSKEYdown', in a similar way to what was implemented by the server 4 in step H40 (step H80).

Then the terminal 2 sends to the server 4 a message of acknowledgment of generating the network session keys ("NwkSkey-Ack" message) signed and encrypted with the network root key NwkKEY (step H90) as previously described in step E100 illustrated in FIG. 3. This message comprises the identifier DevEUI, the identifier NwkEUI, the identifier NetID and the counter RJCount.

This closes the network session refresh procedure of the terminal 2. Consequently, the terminal 2 and the server 4 may use the generated new network session keys (NwkSKEYup' and NwkSKEYdown') that they share for signing (via the generation of a MIC integrity code) and verifying the integrity of the messages (via the verification of the MIC integrity code) that they exchange via the nominal network H-NW.

It is noted that the invention has been described with reference to the LoRaWAN protocol which is of particular advantage in the context of the Internet of Things. However, the invention also applies to types of architecture and protocols (e.g. proprietary ones) other than the LoRaWAN protocol, and which are based just like this protocol, on a network server for allowing communication between a terminal and an application server.

In addition, other encryption and signing algorithms based on other parameters exchanged between the entities of the communication system may be envisaged, and the example provided here is only given by way of illustration within the context of the LoRaWAN protocol.

The invention claimed is:

1. A communication system comprising:
a terminal;
a network server of a telecommunications network, configured to provide at least one network service to said terminal; and
a plurality of application servers, each application server being configured to provide application services to the terminal via the telecommunications network and the network server;
wherein:
the terminal and the network server share and store a same "network root key" kept secret with regard to the application server, and are configured to generate from this network root key at least one network session key to be used for signing and verifying integrity of messages exchanged on the network between the terminal and the network server;

the terminal and each of the plurality of application servers share and store a respective same "application root key" kept secret with regard to the network server and the other application servers of the plurality of application servers, such that the terminal shares separate application root keys with said plurality of application servers, and the terminal and each respective application server are configured to generate from the respective application root key at least one application session key to be used for encrypting and decrypting messages exchanged between the terminal and the respective application server via the network; and the terminal is configured to establish and maintain simultaneous connections with said plurality of application servers.

2. The system as claimed in claim 1, wherein:
the terminal and the network server are configured to generate a "network session key" during a "network connection procedure" for connecting the terminal to the network;
the terminal and each application server are configured for generating an "application session key" during an "application connection procedure" for connecting the terminal to this application server, said application connection procedure being triggered by the terminal after the completion of the network connection procedure.

3. The system as claimed in claim 1, wherein the terminal and the network server are configured to generate at least one "network session key" from the network root key during a terminal session refresh procedure.

4. The system as claimed in claim 1, wherein:
the terminal is configured to send a single request to the network server to connect to said plurality of application servers, this single request comprising an identifier of each application server of said plurality of application servers; and
the network server is configured to send, following the receipt of the single request, a plurality of requests to said plurality of application servers, the request sent to one of the application servers being a request for connecting the terminal to this application server.

5. The system as claimed in claim 1, wherein the network server, the terminal and the plurality of application servers are configured to implement the LoRaWAN protocol.

6. A terminal of a communication system comprising said terminal, a telecommunications network server capable of providing at least one network service to the terminal, a plurality of application servers, each application server being capable of providing application services to the terminal via the telecommunications network and the telecommunications network server,
the terminal comprising:
a processor; and
a non-transitory computer-readable medium comprising instructions stored thereon which when executed by the processor configure the terminal to perform acts comprising:
storing a "network root key" shared with the network server and kept secret with regard to said plurality of application servers;
generating from this network root key, at least one "network session key";
signing and/or verifying messages exchanged between the terminal and the network server by using the network session key;

for each of the plurality of application servers, storing at least one "application root key" shared with the respective application server, and kept secret with regard to the network server and to the other application servers of the plurality of application servers;

for each of the plurality of application servers, obtaining at least one "application session key" from the application root key shared with the respective application server;

establish and maintain simultaneous connections with said plurality of application servers; and for each of the plurality of application servers, performing at least one of encrypting or decrypting messages exchanged between the terminal and the respective application server via the network by using the application session key.

7. The terminal as claimed in claim 6, wherein:

the terminal stores the "network root key" with a first storage module included in a network interface module of the terminal; and the terminal stores the "application root key" for each of the plurality of application servers with a second storage module included in an application module of the terminal.

8. The terminal as claimed in claim 7, wherein the act of generating at least one "session key" is activated by the network interface module in a "network connection procedure" for connecting the terminal to the network server, and the act of obtaining at least one "application session key" is activated by the application module of the terminal in an "application connection procedure" for connecting the terminal to the respective application server, this application connection procedure being implemented by the application module after the completion of the network connection procedure.

9. The terminal as claimed in claim 6, wherein the instructions further configure the terminal to send a single request to the network server to connect to said plurality of application servers, this single request comprising an identifier of each application server of said plurality of application servers.

10. The terminal as claimed in claim 6, wherein the instructions further configure the terminal to send a plurality of requests to the network server to connect to said plurality of application servers, each request comprising an identifier of a separate application server of said plurality of application servers.

11. A communication method within a communication system comprising a terminal, a telecommunications network server capable of providing at least one network service to the terminal, and a plurality of application servers, each application server being capable of providing application services to the terminal via the telecommunications network and the telecommunications network server, this communication method comprising:

a first act of connecting the terminal to the network server comprising a generation by the terminal and by the network server of a "network session key" from a network root key shared between the terminal and the network server and kept secret with regard to the plurality of application servers, this network session key to be used for signing and verifying integrity of messages exchanged on the network between the terminal and the network server;

for each of the plurality of application servers a second act of connecting the terminal to the application server, this second connecting act comprising a generation by the terminal and by the application server of an "application session key" from an application root key shared between the terminal and the application server and kept secret with regard to the network server and the other application servers of the plurality of application servers, such that the terminal shares separate application root keys with said plurality of application servers, this application session key to be used for encrypting and decrypting messages exchanged between the terminal and this application server via the network;

said at least one second connecting act being implemented after the completion of the first connecting act; and the terminal establishing and maintaining simultaneous connections with said plurality of application servers.

* * * * *